C. L. CAMPBELL.
Drying-Kiln.

No. 224,814. Patented Feb. 24, 1880.

UNITED STATES PATENT OFFICE.

CHARLES L. CAMPBELL, OF TERRE HAUTE, INDIANA.

DRYING-KILN.

SPECIFICATION forming part of Letters Patent No. 224,814, dated February 24, 1880.

Application filed November 22, 1879.

*To all whom it may concern:*

Be it known that I, CHARLES L. CAMPBELL, of the city of Terre Haute, county of Vigo, and State of Indiana, have invented a new and useful Apparatus for Drying Distillery-Slop and Similar Substances, of which the following is a specification.

My invention relates to that class of driers in which the material to be dried falls upon a revolving disk, from which it is scraped or brushed by a series of fixed downwardly-projecting brushes or stirrers and falls upon another similar disk, the arrangement being such that the material falls either from the periphery of the upper disk and through an opening in the center of the disk next below, or vice versa; and it consists in certain peculiarities in the details of construction, as will be hereinafter fully described, and then pointed out in the claims.

The main object of my invention is to construct an efficient apparatus for thoroughly and quickly drying distillery-slop or similar substances. This I attain in the manner I will now proceed to describe, reference being made to the accompanying drawings, in which—

Figure 1:
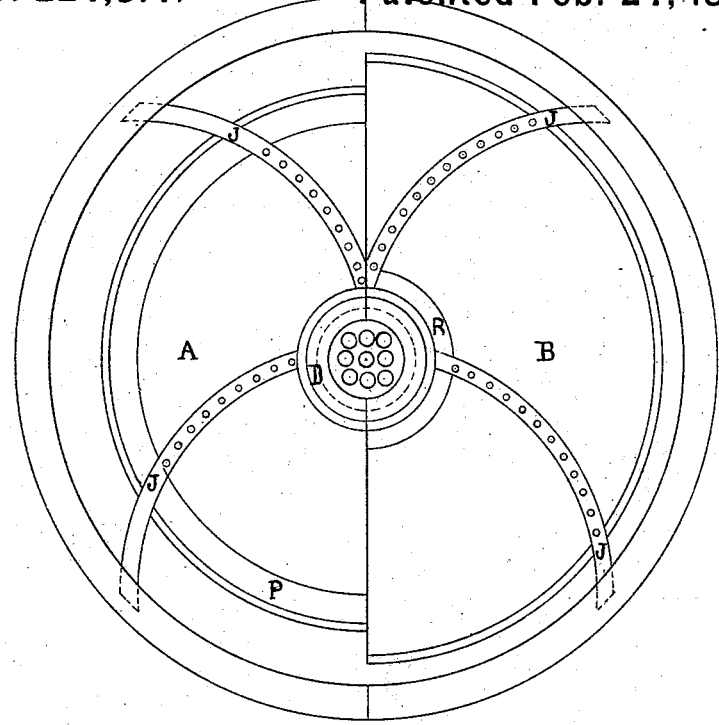
Figure 2:
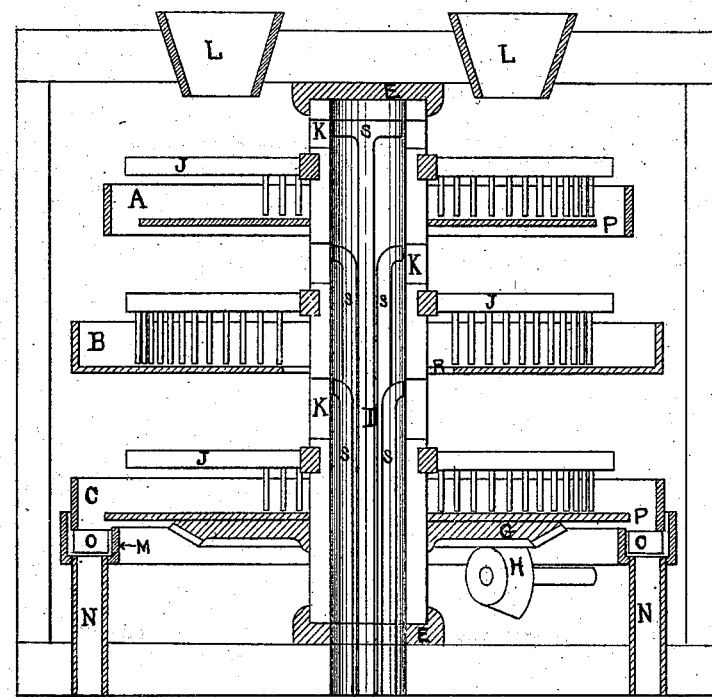

Figure 1 represents half plans of the disks A and B, and Fig. 2 a vertical section of the apparatus.

My device is composed of a circular air-tight kiln, Fig. 2, containing numerous flat disks, A B C, which are fastened to the hollow vertical shaft D, and which are caused to be revolved by a crown-wheel and pinion, G H, attached to the bottom disk. The shaft D is supported by the bearings E E, and to the crown-wheel and pinion G H can be applied suitable mechanism. Above each disk are extending arms J J J, having wire fingers projecting from them, and which are held stationary by collars on said shaft D.

In the top of the kiln are hoppers L L, for the reception of the material to be treated, and under the bottom disk is a circular trough, M, containing openings N N, for the dried material to pass out. Attached to the bottom disk, and revolving with it, are scrapers O O, to prevent the material from accumulating in said trough. In each disk are openings P R, for the material to drop from one to the other, the opening of one, P, being at the outer extremity of the disk, and of the alternate one, R, at the shaft D. Through the hollow shaft D extend hot-air flues S S S to the openings K K K in the shaft D at each disk, so that the heat will be uniformly and equally distributed.

The treatment is as follows: The solids of distillery-slop or other substance, the greater portion of the moisture having been extracted, are precipitated through the hoppers L L to the disk A. This disk being in motion, they are agitated by the arm J and pushed to the opening P, when they drop to the next disk, B. Then, undergoing similar agitation, they drop through the opening R to the disk C, and thus on until they fall to the circular trough M, when they are forced by the scrapers O O to the outlets N N. The solids are subject, from the time they enter the hoppers L L until they fall through the openings N N, to hot air of such temperature as may be deemed necessary, and they come out in a state for preservation.

I am aware that a drier having a series of air-tubes which are of various lengths, and which are adapted to discharge at various elevations into a drying-chamber, is not new, and therefore I do not broadly claim such a construction; but, Having described my invention, I claim—

1. The combination, with the central trunk, D, having revolving disks A B C and fingered arms J, as described, of the inclosed hot-air pipes S S S, one or more of which is adapted to discharge through suitable openings into each of the spaces between the disks, substantially as described.

2. In a drier having a central perforated trunk, revolving disks, fixed conveyers, and air-inlet pipes, essentially as described, the combination, with the lowermost disk, the discharging-space P, and pipes N N, of the clearing-scrapers O, substantially as and for the purpose indicated.

CHARLES L. CAMPBELL.

Witnesses:
JACOB STEINMEHL,
A. BRUCE COFFROTH.